US006986969B2

(12) United States Patent
Anglin et al.

(10) Patent No.: US 6,986,969 B2
(45) Date of Patent: Jan. 17, 2006

(54) ALKALINE CELL WITH FLAT HOUSING AND IMPROVED CURRENT COLLECTOR

(75) Inventors: David Anglin, Brookfield, CT (US); Mark Ashbolt, Newtown, CT (US); Anthony Malgioglio, Stamford, CT (US); Alexander Shelekhin, Ridgefield, CT (US); Steven J. Specht, Brookfield, CT (US); Matthew Sylvestre, Woodbury, CT (US); Philip Trainer, Sandy Hook, CT (US); Robert A. Yoppolo, New Milford, CT (US)

(73) Assignee: The Gillette Company, Boston, MA (US)

( * ) Notice: Subject to any disclaimer, the term of this patent is extended or adjusted under 35 U.S.C. 154(b) by 378 days.

(21) Appl. No.: 10/336,475

(22) Filed: Jan. 3, 2003

(65) Prior Publication Data

US 2004/0131942 A1 Jul. 8, 2004

(51) Int. Cl.
*H01M 4/64* (2006.01)

(52) U.S. Cl. .................... 429/233; 429/163; 429/168; 429/170

(58) Field of Classification Search ................ 429/163, 429/168, 170, 233
See application file for complete search history.

(56) References Cited

U.S. PATENT DOCUMENTS

| 3,314,824 A | 4/1967 | Spanur |
| 5,283,139 A | 2/1994 | Newman |
| 5,422,201 A | 6/1995 | Georgopoulos |
| 5,589,293 A | 12/1996 | Pope |
| 5,759,713 A | 6/1998 | DePalma |
| 6,168,883 B1 | 1/2001 | Urry |
| 6,399,243 B1 | 6/2002 | Kaplan |
| 6,482,543 B1 | 11/2002 | Shelekhin |
| 6,780,539 B2 * | 8/2004 | Bobowick et al. .......... 429/159 |
| 2003/0022061 A1 * | 1/2003 | Duprey et al. .............. 429/174 |

FOREIGN PATENT DOCUMENTS

| WO | WO 00/02278 | 1/2000 |
| WO | WO 01/82396 A2 | 11/2001 |

OTHER PUBLICATIONS

Citation to Gold Peak Batteries flat nickel metal hydride cell, referenced at p14, last para. of the subject Application.

* cited by examiner

*Primary Examiner*—Dah-Wei Yuan
(74) *Attorney, Agent, or Firm*—Barry D. Josephs; Thomas G. Krivulka

(57) ABSTRACT

An alkaline cell having a flat housing, preferably of cuboid shape. The cell can have an anode comprising zinc and a cathode comprising $MnO_2$. The housing can have a relatively small overall thickness, typically between about 5 and 10 mm. Cell contents can be supplied through an open end in the housing and an end cap assembly inserted therein to seal the cell. The end cap assembly includes an insulating sealing member having a circumferential skirt which surrounds wide portions of the anode current collector. This provides a barrier between said wide portions of the current collector and the cell housing. The end cap assembly includes a vent mechanism which can activate, when gas pressure within the cell reaches a level typically between about 100 and 300 psig ($6.89 \times 10^5$ and $20.69 \times 10^5$ pascal gage). The cathode can be formed of a plurality of stacked slabs having aligned hollow centers forming a central core with anode material placed therein. A separator is between anode and cathode. The housing can be of steel having a wall thickness desirably between about 0.30 and 0.45 mm.

4 Claims, 5 Drawing Sheets

ALKALINE CELL WITH FLAT HOUSING AND IMPROVED CURRENT COLLECTOR

FIELD OF THE INVENTION

The invention relates to an alkaline battery having a substantially flat outer housing and improved anode current collector. The invention relates to alkaline battery having an anode comprising zinc, a cathode comprising manganese dioxide, and an electrolyte comprising aqueous potassium hydroxide.

BACKGROUND

Conventional alkaline electrochemical cells have an anode comprising zinc and a cathode comprising manganese dioxide. The cell is typically formed of a cylindrical outer housing. The fresh cell has an open circuit voltage (EMF) of about 1.5 volt and typical average running voltage of between about 1.0 to 1.2 Volt in medium drain service (100 to 300 milliamp). The cylindrical housing is initially formed with an enlarged open end and opposing closed end. After the cell contents are supplied, an end cap assembly with insulating grommet and negative terminal end cap is inserted into the housing open end. The open end is closed by crimping the housing edge over an edge of the insulating plug and radially compressing the housing around the insulating plug to provide a tight seal. The insulating grommet electrically insulates the negative end cap from the cell housing. A portion of the cell housing at the opposing closed end forms the positive terminal.

A problem associated with design of various electrochemical cells, particularly alkaline cells, is the tendency of the cell to produce gases as it continues to discharge beyond a certain point, normally near the point of complete exhaustion of the cell's useful capacity. Electrochemical cells, particularly alkaline cells, are conventionally provided with rupturable diaphragms or rupturable membranes within the end cap assembly. The rupturable diaphragm or membrane may be formed within a plastic insulating member as described, for example, in U.S. Pat. No. 3,617,386.

The prior art discloses rupturable vent membranes, which are integrally formed as thinned areas within the insulating disk included within the end cap assembly. Such vent membranes can be oriented such that they lie in a plane perpendicular to the cell's longitudinal axis, for example, as shown in U.S. Pat. No. 5,589,293, or they may be oriented so that they are slanted in relation to the cell's longitudinal axis as shown in U.S. Pat. No. 4,227,701. U.S. Pat. No. 6,127,062 discloses an insulating sealing disk and an integrally formed rupturable membrane, which is oriented vertically, that is, parallel to the cell's central longitudinal axis. When the gas pressure within the cell rises to a predetermined level the membrane ruptures thereby releasing the gas pressure to the external environment through apertures in the end cap.

Other types of vents are disclosed in the art for relieving gas pressure within an electrochemical cell. One such vent is a reseatable rubber plug, which has been used effectively in connection with small flat rectangular shaped nickel metal hydride rechargeable cells. One such rechargeable battery with the reseatable rubber plug vent is a 7/5-F6 size nickel metal hydride rechargeable battery available commercially as battery model GP14M145 manufactured by Gold Peak Batteries, Hong Kong. The rubber plug is physically compressed to sit tightly within a beveled aperture within a cavity or seat in the cell's end cap assembly. When the cell's internal gas pressure reaches a predetermined level, the plug lifts off its seat thereby letting gas to escape through the underlying aperture. The plug reseats itself when the gas pressure within the cell returns to normal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable, since it has a high density and high purity. The electrical conductivity (resistivity) of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector in conventional cylindrical alkaline cells. Suitable electrically conductive additives can include, for example, graphite, graphitic material, conductive carbon powders, such as carbon blacks, including acetylene blacks. Preferably the conductive material comprises flaky crystalline natural graphite, or flaky crystalline synthetic graphite, including expanded or exfoliated graphite or graphitic carbon nanofibers and mixtures thereof.

There are small size rectangular shaped rechargeable batteries now available, which are used to power small electronic devices such as MP3 audio players and mini disk (MD) players. These batteries are typically in the shape of a small cuboid (rectangular parallelepiped) somewhat the size of a pack of chewing gum. The term "cuboid" as used herein shall mean its normal geometrical definition, namely, a "rectangular parallelepiped". Such batteries, for example, can be in the form of replaceable rechargeable nickel metal hydride (NiMH) size F6 or 7/5F6 size cuboids in accordance with the standard size for such batteries as set forth by the International Electrotechnical Commission (IEC). The F6 size has a thickness of 6.0 mm, width of 17.0 mm and length of 35.7 mm (without label). There is a version of the F6 size wherein the length can be as great as about 48.0 mm. The 7/5-F6 size has thickness of 6.0 mm, width of 17.0 mm, and length of 67.3 mm. According to the IEC standard, allowed deviation for the 7/5-F6 size in thickness is +0 mm, −0.7 mm, in width is +0 mm, −1 mm, and in length is +0, −1.5 mm. The average running voltage of the F6 or 7/5F6 NiMH rechargeable batteries when used to power miniature digital audio players such as an MP3 audio player or mini disk (MD) players is between about 1.1 and 1.4 volt typically about 1.12 volt.

When used to power the mini disk (MD) player the battery is drained at a rate of between about 200 and 250 milliAmp. When used to power a digital audio MP3 player the battery is drained typically at a rate of about 100 milliAmp.

It would be desirable to have a small flat alkaline battery of the same size and shape as small size cuboid shaped (rectangular parallelepiped) nickel metal hydride batteries, so that the small alkaline size battery can be used interchangeably with the nickel metal hydride battery to power small electronic devices such as mini disk or MP3 players.

It would be desirable to use a primary (nonrechargeble) alkaline battery, preferably a zinc/$MnO_2$ alkaline battery as a replacement for small rectangular shaped rechargeable batteries, particularly small size nickel metal hydride rechargeable battery.

However, a particular problem associated with the design of rectangular (cuboid) shaped primary Zn/$MnO_2$ alkaline battery is that of the tendency of the electrodes to swell during cell discharge. Both anode and cathode swells during discharge.

For a given housing wall thickness, it will be appreciated that a rectangular shaped cell housing is less able to withstand a given increase in cell internal pressure (due to gassing and cathode expansion) than a cylindrical shaped housing of comparable size and volume. This is due to the significantly higher circumferential stress (hoop stress) imposed on a rectangular (cuboid) shaped housing than on a similar size cylindrical housing for any given pressure and housing wall thickness. The problem of bulging or swelling associated with rectangular shaped cells can be overcome by significantly increasing the wall thickness of the housing. However, a significant increase in housing wall thickness can result in significant decrease in available volume for anode and cathode materials for rectangular cells having small overall thickness, e.g. under about 10 mm. The added wall thickness adds to the cost of manufacture of the cell. In this regard it is desirable to keep the housing wall thickness below about 0.50 mm, preferably less than about 0.47 mm.

Thus it is desired to design a small flat (nonrechargeable) alkaline cell, such as an F6 or 7/5-F6 size cell having a rectangular (cuboid) shaped housing, but yet with small housing wall thickness, wherein the housing does not significantly bulge or swell during normal cell usage.

It is desired that such rectangular cell be used as a replacement for a same size flat nickel metal hydride rechargeable cell.

SUMMARY OF THE INVENTION

A principal aspect of the invention is directed to a primary (nonrechargeable) alkaline cell which generates hydrogen gas upon discharge, wherein said cell has an outer casing (housing), an end cap assembly which includes a vent mechanism which allows the hydrogen gas to escape from the cell when gas pressure reaches a predetermined level. The casing has at least a pair of opposing flat walls running along the cell's length.

An end cap assembly is inserted into the casing open end and sealed by crimping or welding to close the casing. The alkaline cell may be in the shape of a parallelepiped, but desirably in the shape of a cuboid (rectangular parallelepiped). The casing, is thus preferably of cuboid shape, which does not have any integral cylindrical sections. The alkaline cell desirably has an anode comprising zinc, and an aqueous alkaline electrolyte, preferably aqueous solution of potassium hydroxide.

An end cap assembly includes a venting mechanism and preferably a rectangular shaped metallic cover. The cover is used to close to the open end of the casing after the cell contents are inserted into the casing. The metallic cover can form the cell's negative terminal if insulation is inserted between the edge of the said cover and the casing edge. Alternatively, the cover can be welded directly to the casing edge. If the cover is welded to the casing edge, a separate end cap insulated from the cover can be employed in electrical communication with the anode to function as the cell's negative terminal. The casing is positive and forms the cell's positive terminal.

The cathode comprising $MnO_2$ is inserted, preferably in the form of a plurality of compacted slabs or disks. The cathode slabs or disks are preferably rectangular shaped, each having a central hollow core running through the slab's thickness. The slabs are inserted so that they are stacked one on top of another. The slabs are aligned along the cell's length, so that their outside surface is in contact with the inside surface of the casing. The stacked cathode slabs form a central hollow core running along the cell's longitudinal axis. The inside surface of each cathode slab, which defines the central hollow core within the slab, is preferably a curved surface. Such curved inside surface improves the mechanical strength of the slab during transfer and handling and also provides more uniform contact between the electrolyte permeable separator and the cathode. The separator is inserted into the cell's central hollow core so that the outside surface of the separator abuts and closely contacts the inside surface of the cathode. An anode slurry comprising zinc particles is inserted into the central hollow core with the separator providing the interface between anode and cathode.

In an aspect of the invention the end cap assembly has an elongated anode current collector, which is inserted into the anode and in electrical communication with the cell's negative terminal. The end cap assembly has an insulating sealing member, which insulates such anode current collector from the cell's outer casing. The end cap assembly has a vent mechanism, which can be a resilient rubber plug compressed into a cavity within the insulating sealing member or a metallic rivet passing through the insulating sealing member. When gas pressure within the cell reaches a predetermined threshold level, the plug lifts out of the cavity enough to let the gas escape therefrom. Alternatively, the vent mechanism may comprise a rupturable membrane, which can form an integral part of the insulating sealing member.

In an aspect of the invention the vent mechanism is designed to activate when the cell's internal gas pressure reaches a threshold level of between about 100 and 300 psig ($6.895 \times 10^5$ and $20.69 \times 10^5$ pascal gage), desirably between about 100 and 200 psig ($6.895 \times 10^5$ and $13.79 \times 10^5$ pascal gage). The outer casing (housing) is desirably of steel, preferably of nickel-plated steel. The casing wall thickness is desirably between about 0.30 and 0.45 mm, preferably between about 0.30 and 0.40 mm, more desirably between about 0.35 and 0.40.

In another aspect of the invention at least the widest portion of the anode current collector is surrounded by an insulating barrier between such wide portion of the current collector and the cell's casing. It has been determined that narrow gaps, for example, of less than about 0.5 mm, between any surface of the anode current collector and the cell's casing inside surface can provide regions in which corrosive by-products can occur during cell discharge. This in turn can passivate neighboring regions of the anode current collector and promote gassing. It has been determined that it is desirable to provide the insulating sealing member with a downward extending skirt which surrounds wide portions of the current collector. This produces a barrier between the current collector wide portions and cell casing and reduces the production of corrosive chemicals or gassing in that space during cell discharge. In a preferred aspect the widest part of the anode current collector is between about 0.5 and 2 mm, preferably between about 0.5 and 1.5 mm from the casing inside surface and the insulating skirt preferably surrounds such wide portions of the anode current collector. These design features were determined to reduce the production of corrosive chemicals between anode and cell casing. Such corrosive chemicals can include complex metal containing substances or compounds, which can promote gassing and interfere with proper cell performance. The resolution of this problem made the resealable rubber vent plug assembly suitable as a viable vent mechanism for the flat primary alkaline cell of the invention.

In an aspect of the invention the cell is balanced so that the cathode is in excess. Desirably the cell is balanced so that the ratio of theoretical capacity of the $MnO_2$ (based on a theoretical specific value of 370 mAmp-hr per gram $MnO_2$) divided by the mAmp-hr capacity of zinc (based on a theoretical specific value of 820 mAmp-hr per gram zinc) is between about 1.15 and 2.0, desirably between about 1.2 and 2.0, preferably between about 1.4 and 1.8. It has been determined that design of the flat alkaline cell herein at higher ratio of theoretical capacity of $MnO_2$ to theoretical capacity of zinc reduces the amount of overall swelling. It is not known with certainty why this occurs. It may be in part due to the fact the most all of the zinc gets discharged. In such case there is little if any zinc hydroxide intermediates left in the anode, which can cause swelling.

The ratio of anode thickness to the casing outside thickness is desirably between about 0.30 and 0.40. (Such thicknesses are measured along a plane perpendicular to the cell's longitudinal axis, across the outside thickness of the cell.) Swelling of the cell upon discharge is thereby controlled allowing a flat or rectangular shaped alkaline cell to be used as a primary power source for electronic devices such as portable digital audio players and the like.

In a specific aspect the alkaline cell has the overall shape of a small cuboid (rectangular parallelepiped), typically having an outside thickness between about 5 and 10 mm, particularly a thickness between about 5 and 7 mm. The outside thickness is measured by the distance between the outside surface of opposing sides of the housing defining the short dimension of the cell. In such embodiment the primary (nonrechargeable) alkaline cell of the invention can be used, for example, as a replacement for small size flat rechargeable cells. In particular such primary alkaline cell can be used as a replacement for same sized rechargeable nickel metal hydride cells, for example, the 7/5-F6 size rectangular rechargeable nickel metal hydride cell.

DETAILED DESCRIPTION

Figure 1:
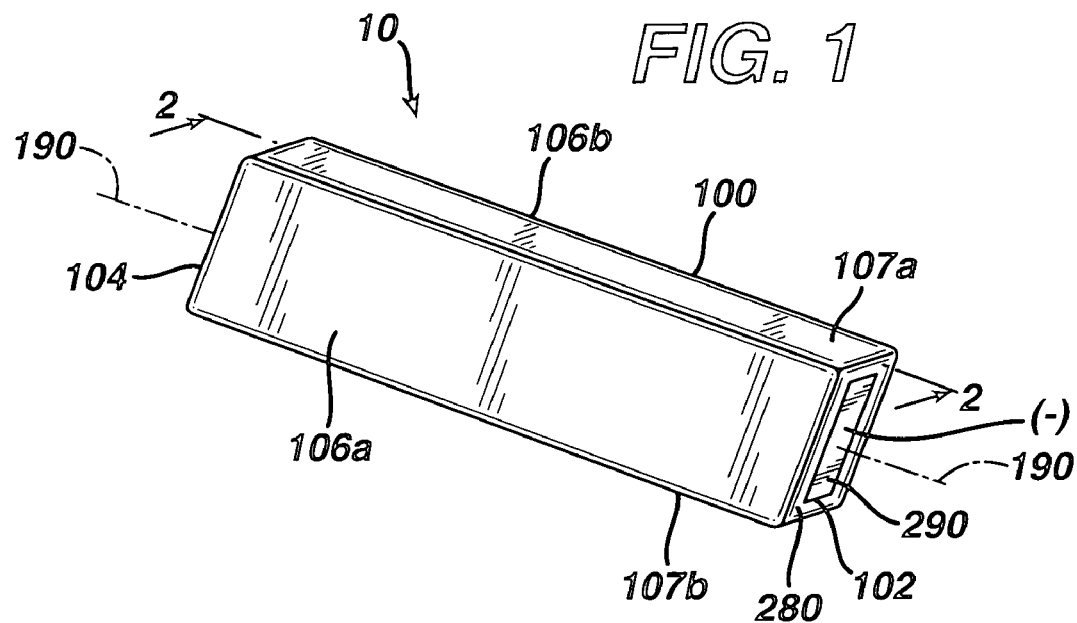
FIG. 1 is perspective view of the flat alkaline cell of the invention showing the cell's negative terminal end.

A specific embodiment of the flat alkaline cell 10 of the invention is shown in FIGS. 1–5. Cell 10 has at least two flat opposing sides, which are parallel to the cell's longitudinal axis. Cell 10 is preferably of rectangular shape, that is, a cuboid, as shown best in FIGS. 1 and 1A. The term "cuboid" as used herein shall mean the geometrical definition, which is a rectangular parallelepiped. However, cell 10 can also be a parallelepiped. Outer casing 100 as shown in the figures preferably is of cuboid shape, thus without having any integral cylindrical sections. Cell 10 typically has a thickness smaller than its width and a width smaller than its length. When cell thickness, width, and length are of different dimensions, the thickness will normally be considered the smallest of these three dimensions.

The cell 10 preferably comprises a cuboid shaped casing (housing) 100, preferably of nickel plated steel. In the embodiment shown in the figures, casing (housing) 100 is bounded by a pair of opposing large flat walls 106a and 106b; a pair of opposing small flat walls 107a and 107b; a closed end 104; and opposing open end 102. The cell's thickness is defined by the distance between the outside surfaces of walls 106a and 106b. The cell's width is defined by the distance between the outside surface of walls 107a and 107b. Casing 100 is desirably coated on its inside surface with a layer of carbon or indium to improve conductivity. Cell contents comprising a anode 150, cathode 110 and separator 140 therebetween are supplied through the open end 102. In a preferred embodiment the anode 150 comprises particulate zinc, the cathode 110 comprises MnO2. An aqueous solution of potassium hydroxide forms a portion of the anode and cathode.

Figure 2:
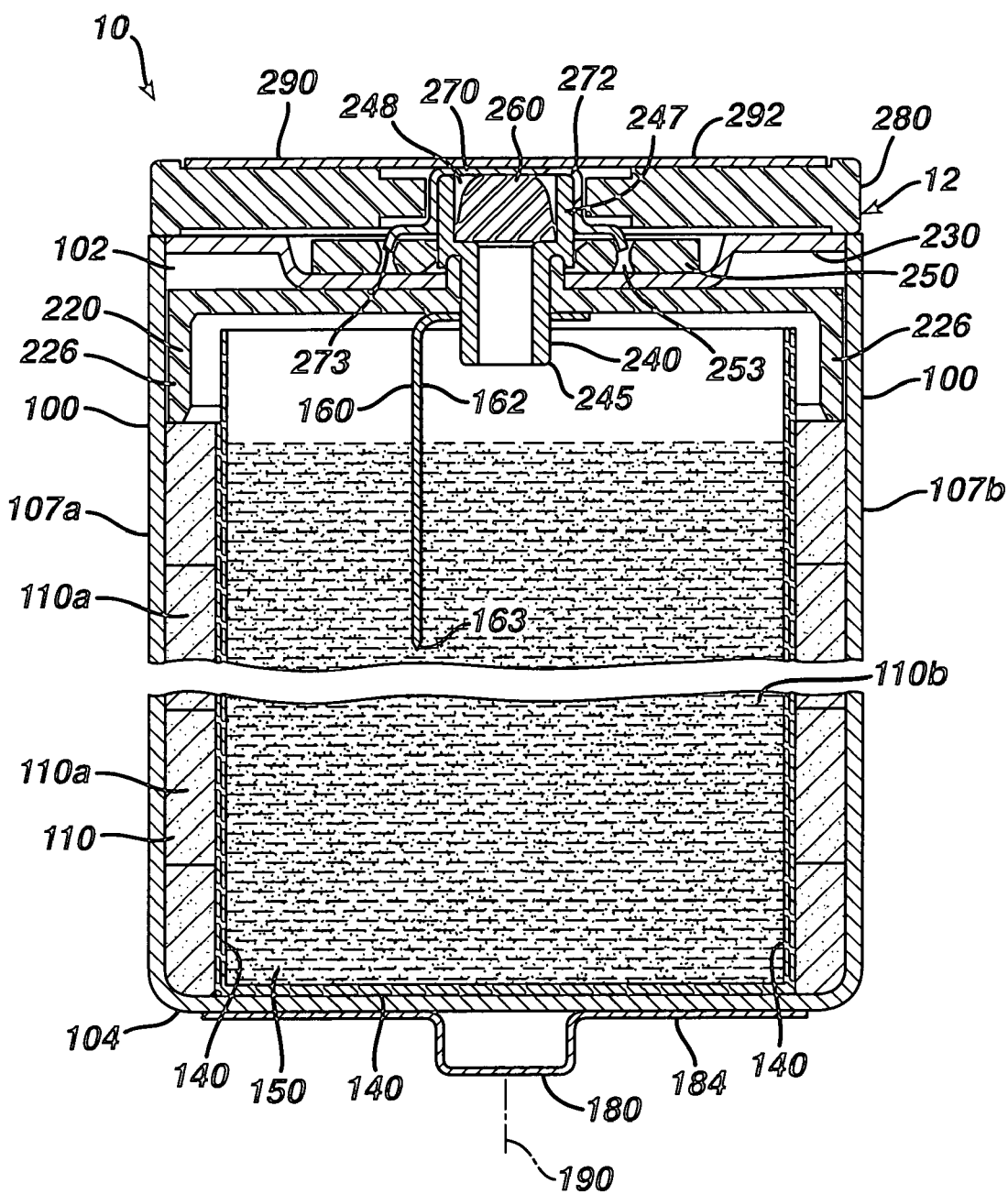
FIG. 2 is a cross sectional view of the cell shown in FIG. 1A taken along view lines 2—2.
Figure 3:
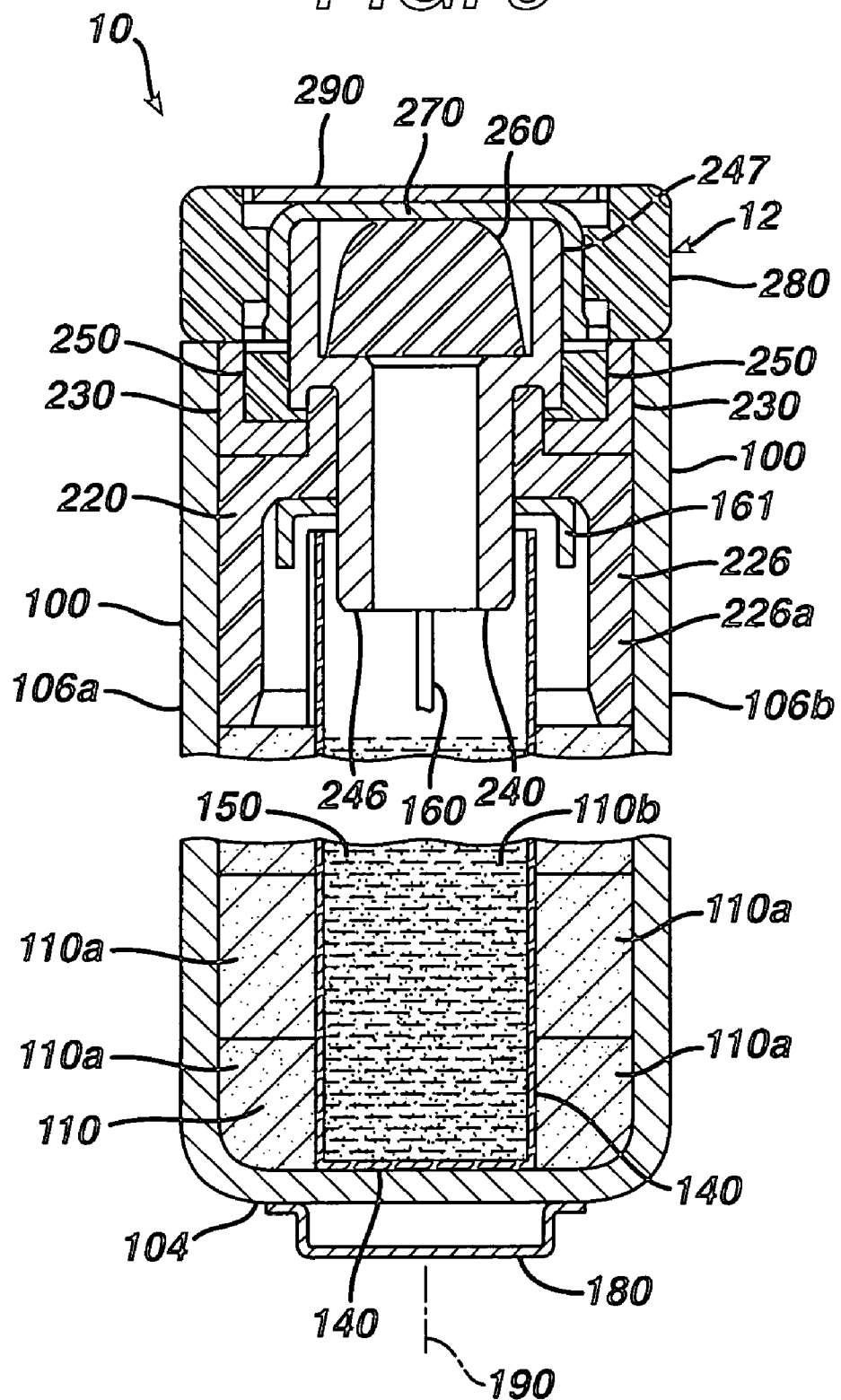
FIG. 3 is a cross sectional view of the cell shown in FIG. 2A taken along view lines 3—3.
Figure 5:
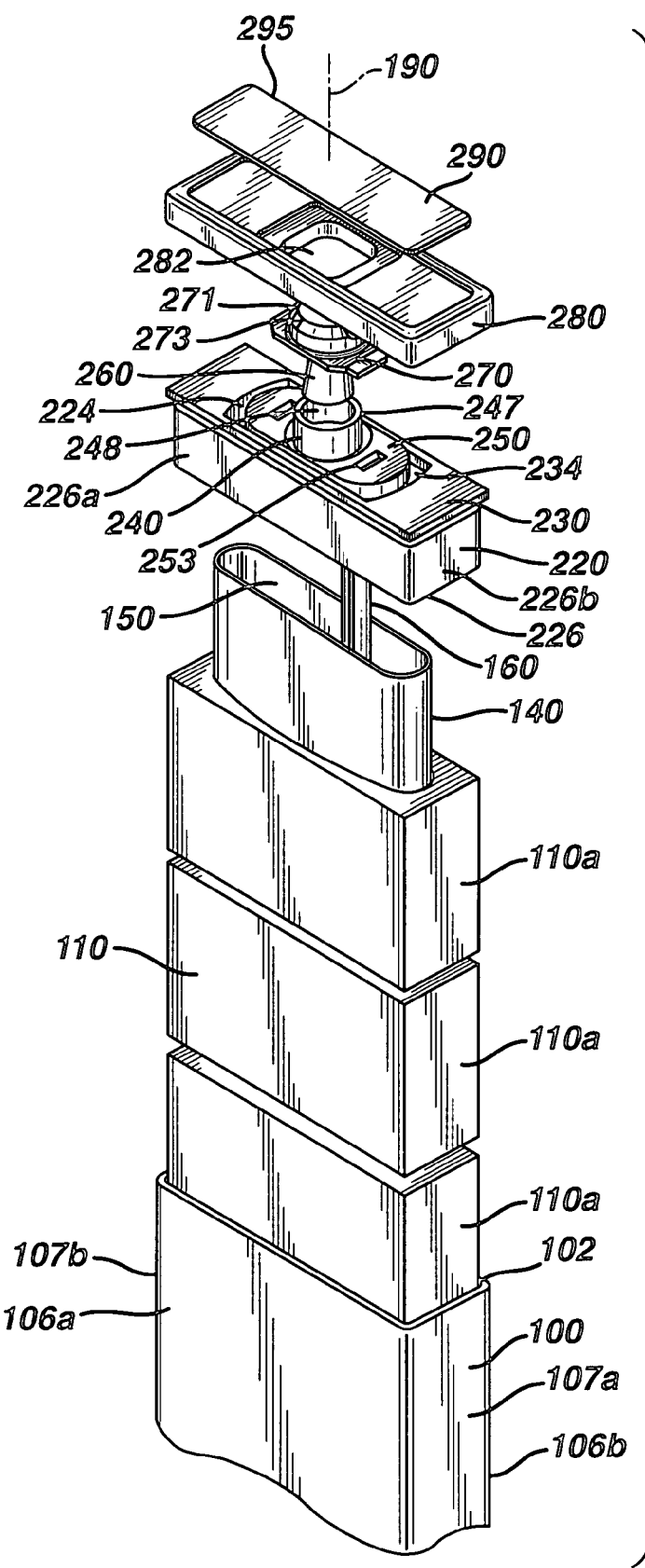
FIG. 5 is an exploded view showing installation of the cell contents and end cap assembly into the cell casing (housing).

The cathode 110 may be in the form of a plurality of slabs 110a having a hollow central core 110b through its thickness, shown best in FIG. 5. The cathode slabs 110a preferably are of overall rectangular shape. The cathode slabs 110a are inserted into casing 100 and stacked vertically one on top of the other along the cell's length as shown in FIGS. 2, 3 and 5. Each cathode slab 110a may be recompacted after it is inserted into casing 100. Such recompaction assures that the outside surface of each cathode slab 110a is in intimate contact with the inside surface of casing 100. Preferably, the hollow central cores 110b within cathode slabs 110a are aligned to form one continuous central core along the cell's longitudinal axis 190, for receiving anode slurry 150 optionally, the cathode slab 110a closest to the closed end 104 of casing 100, can have a bottom surface which abuts and covers the inside surface of closed end 104.

Cathode slabs 110a can be die cast or compression molded. Alternatively, cathode 110 can be formed of cathode material which is extruded through a nozzle to form a single continuous cathode 110 having a hollow core. Cathode 110 can also be formed of a plurality of slabs 110a with hollow core 110b, wherein each slab is extruded into casing 100.

After cathode 110 is inserted, an electrolyte permeable separator 140 is then positioned within central core 110b of each slab 110a so that the outside surface separator 140 abuts the inside surface of the cathode as shown in FIGS. 2, 3, and 5. The inside surface of each cathode slab 110a, which defines said hollow central core 110b, is preferably a curved surface. Such curved inside surface improves the mechanical strength of the slab during transfer and handling and also provides more uniform contact between the separator 140 and the cathode 110.

Anode 150, is preferably in the form of a gelled zinc slurry comprising zinc particles and aqueous alkaline electrolyte. The anode slurry 150 is poured into the central core of the cell along the cell's longitudinal axis 190. Anode 150 is thus separated from direct contact with cathode 110 by separator 140 therebetween.

Figure 1A:
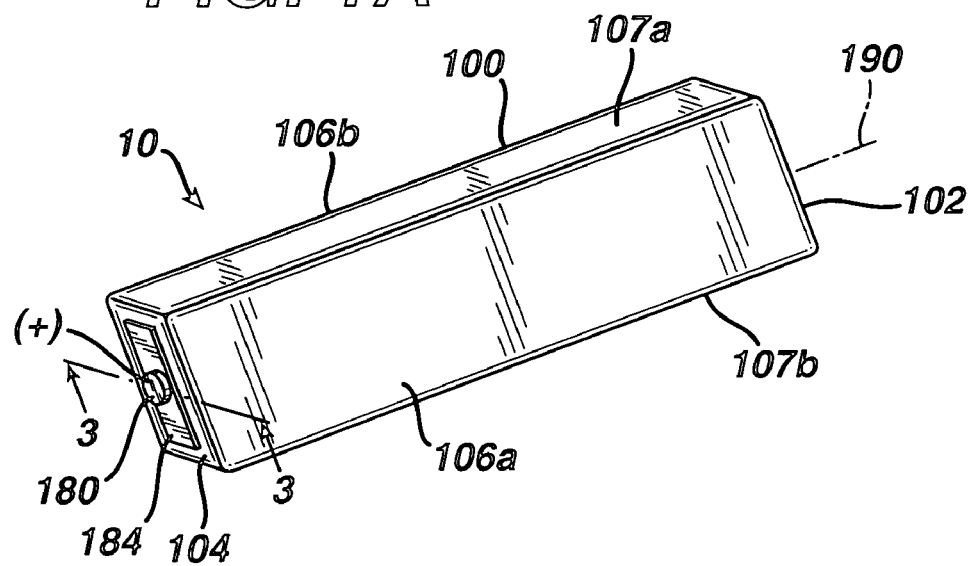
FIG. 1A is a perspective view of the flat alkaline cell of FIG. 1 showing the cell's positive terminal end.

After the cell contents are supplied, the cell assembly 12 (FIG. 4) is then inserted into the open end 102 to seal the cell and provide a negative terminal 290. The closed end 104 of the casing can function as the cell's positive terminal. The closed end 104 can be drawn or stamped to provide a protruding positive pip or else a separate end plate 184 having a protruding pip 180 can be welded to the closed end 104 of the casing as shown in FIG. 1A.

Figure 4:
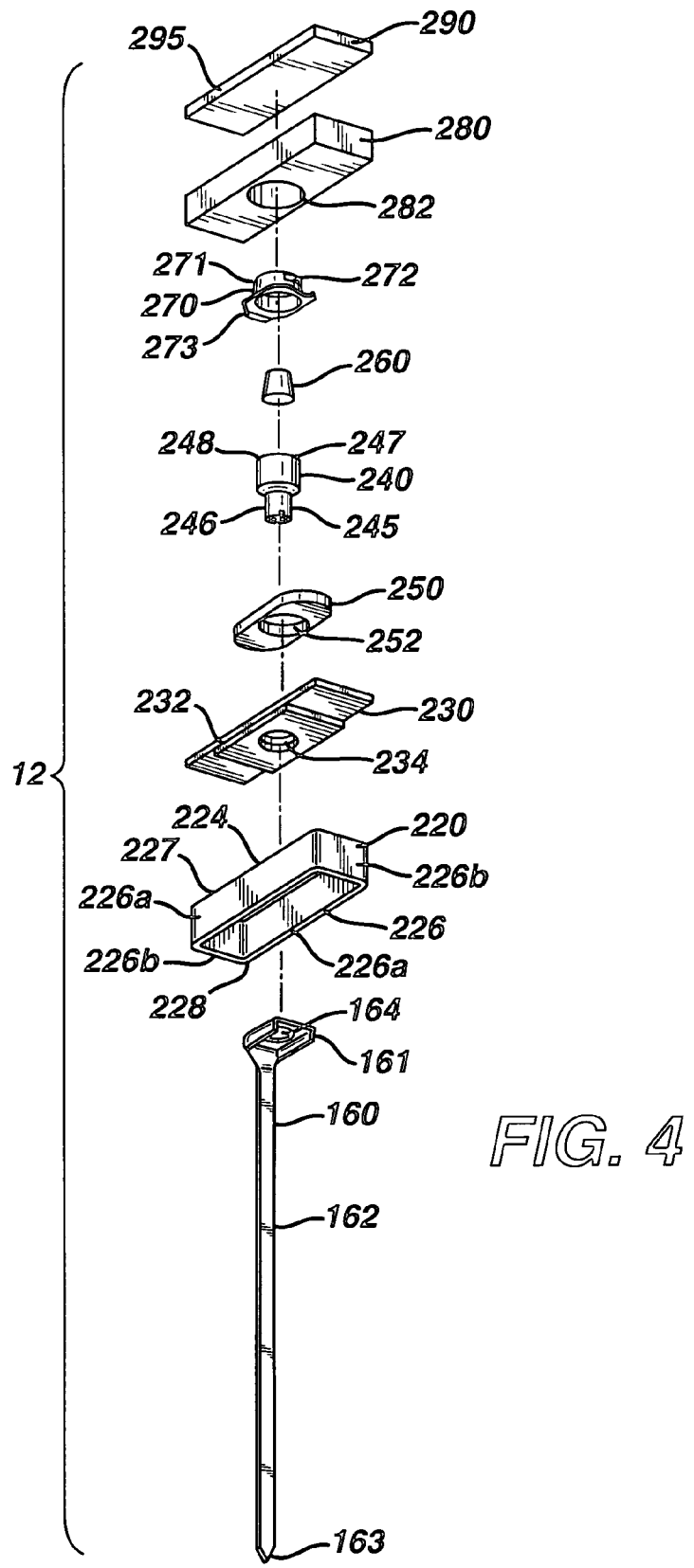
FIG. 4 is an exploded view of the components comprising the end cap assembly for the flat alkaline cell.

The components comprising a specific embodiment of the end cap assembly 12 are shown best in FIG. 4. End cap assembly 12 comprises an elongated anode current collector 160; an insulating sealing member 220; a metal cover 230 which lies over sealing member 220; a metal rivet 240 which penetrates partially through insulating sealing member 220; a plastic spacer 250, which insulates rivet 240 from metal cover 230; a rubber vent plug 260 seated within a cavity 248 in rivet 240; a vent pip cap 270 over rubber plug 260; a plastic extender 280; and a negative terminal plate 290 over plastic extender 280.

It is herein acknowledged that rubber vent plug 260 as seated within a cavity 248 within a rivet 240, and vent pip cap 270 over rubber plug 260 have been disclosed and used in connection with a commercial 7/5-F6 size rectangular rechargeable nickel metal hydride battery Model No. GP14M145 made by Gold Peak Batteries, Hong Kong. However, Applicants of the present patent application herein have determined that the end cap assembly as a whole in said nickel metal hydride rechargeable battery Model No. GP14M145 causes corrosion and promotes gassing if applied to a primary zinc/$MnO_2$ alkaline cell. Such corrosion was found to occur between the elongated current collector and the inside surface of the cell housing because the widest part of the current collector was very close (less than about 0.5 mm) to the cell housing inside surface. It will be appreciated that a wide portion, namely flange 161, of current collector 160 is employed in connection with the reseatable vent plug design. Such wide portion of the current collector (flange 161) is required because the current collector is riveted to the underside of insulating sealing member 220. Thus, flange 161 must be sufficiently wide to fasten base 246 of rivet 240 thereto. If the cell 10 is a small size flat cell, for example a cuboid shaped cell having an overall thickness between about 5 and 10 mm, an edge of flange 161 will, therefore, terminate close to an inside surface of casing 100.

Applicants have modified the subassembly comprising current collector 160 and insulating sealing member 220 by redesigning the insulating sealing member 220 to provide it with a circumventing skirt 226. The insulating sealing skirt 226 surrounds the widest part, namely flange 161 of anode current collector 160. Insulating skirt 161 thus provides a barrier between the edge of current collector flange 161 and the inside surface of casing 100. The insulating skirt 161 has been determined to reduce the production of corrosive chemicals, typically metal containing complexes or compounds, in the space between flange 161 and the inside surface of casing 100 during cell discharge. Such corrosive chemicals, if produced in quantity, can interfere with cell performance and promote cell gassing. Also, in the modified design herein described the widest part of the anode current collector 160, namely, flange 161 is between about 0.5 and 2 mm, preferably between about 0.5 and 1.5 mm from the housing inside surface. This in combination with the use of insulating sealing skirt 226 surrounding current collector flange 161 was determined to prevent the production of any significant amount of corrosive chemicals between current collector wide portion (flange 161) and the casing 100 inside surface. Such modified design of the invention in turn made the reseatable rubber vent plug assembly suitable as a viable vent mechanism for the flat primary alkaline cell herein described.

The components of the end cap assembly 12 shown best in FIGS. 4 and 5 can be assembled in the following manner: The anode current collector 160 comprises an elongated shaft or wire 162 terminating at its bottom end in tip 163 and terminating at its top end in an outwardly extending integral flange 161, which is preferably at right angles to shaft 162. Thus when the current collector 160 is inserted into anode 150, the edge of outwardly extending flange 161 can be closer to the inside surface of casing 100 than shaft 162. Insulating sealing member 220 has a top panel 227 and opposing open bottom 228. Insulating sealing member 220 is preferably of nylon 66 or nylon 612, which is durable, resistant to alkaline, and permeable to hydrogen. Alternatively, insulating sealing member 220 may be composed of polypropylene, talc filled polypropylene, sulfonated polyethylene or other polyamide (nylon) grades, which are durable and hydrogen permeable. Insulating member 220 is preferably rectangular so that it can fit snugly within the open end 102 of casing 100. The opposing side walls 226a and opposing end wall 226b extending from top end 227 of insulating member 220 forms a downwardly extending skirt 226 around top panel 227. Skirt 226 defines the bounds of open bottom 228 of said insulating sealing member 220. There is an aperture 224 through the top panel 227. There is a metal cover 230 which can be a metal plate having an aperture 234 therethrough. There is a metal rivet 240 having a head 247 and base 245. Rivet 240 can be of nickel plated steel or stainless steel. Rivet 240 has a cavity 248 within head 247. Cavity 248 passes completely through rivet head 247 and the rivet shaft 245. The flange 161 of current collector 160 is inserted into the open bottom 228 of insulating sealing member 220 so that the flange 161 of the current collector 160 is surrounded and protected by insulating skirt 226 of said sealing member 220. As shown in FIG. 4, flange portion 161 of current collector 160 has an aperture 164 therethrough. The base 246 of rivet 240 can be passed through said aperture 164 and riveted to said flange 161 to keep the current collector 160 in electrical contact with said rivet. In such embodiment insulating skirt 226 provides a barrier between flange 161 of the current collector and the inside surface of the cell's casing 100. It has been determined that narrow gaps, for example, less than about 0.5 mm, between any surface of the anode current collector 160 and the cell's casing 100 inside surface can provide regions in which corrosive by-products can occur during alkaline cell discharge. This in turn can passivate neighboring regions of the anode current collector 160 and promote gassing. The downward extending skirt 226 of insulating sealing member 220 is intended to surround outwardly extending portions of the current collector 160 such as integral flange 161, thereby providing a barrier between the widest portions of the current collector 160 and casing 100.

This has been determined to resolve the corrosion problem and reduce gassing. Applicant has modified the design by redesigning the widest part of the current collector preferably by providing a barrier, namely an insulating skirt 226 surrounding the widest part, namely flange 161 of anode current collector 160. The placement and effect of skirt 226 are described in greater detail in the following paragraphs herein. In Applicant's modified design herein described the widest part of the anode current collector 160, namely flange 161, is between about 0.5 and 2 mm, preferably between about 0.5 and 1.5 mm from the housing inside surface. Also, circumventing insulating skirt 226 provided a barrier between current collector flange 161 and casing 100. These design features were determined to resolve the corrosion problem and make the reseatable rubber vent plug assembly suitable as a viable vent mechanism for the flat primary alkaline cell of the invention.

In forming end cap assembly 12, the flange portion 161 of current collector 160 is positioned so that aperture 164 therethrough is aligned with aperture 224 through top panel 227 of the insulating sealing member 220. The metal cover 230 is positioned over the top panel 227 of the insulating sealing member 220 so that aperture 234 through metal cover 230 is aligned with aperture 224. A plastic spacer disk 250 is inserted over metal cover 230 so that the aperture 252 through spacer disk 250 is aligned with aperture 234 of metal cover 230. In the preferred embodiment (FIG. 4), the base 246 of rivet 240 is passed through aperture 252 of plastic spacer 250 and also through aperture 234 of metal cover 230. Base 246 of rivet 240 is also passed through aperture 224 of insulating sealing member 220 and aperture 164 of current collector flange 161. Plastic spacer 250 insulates rivet 240 from metal cover 230. The base 246 of rivet shaft 245 extends through aperture 224 of the insulating sealing member 220 and underlying aperture 164 within the top flange portion 161 of anode current collector 160. Base 246 of the rivet shaft can be hammered into place against the bottom surface of current collector flange 161 using an orbital riveter or the like. This locks the rivet shaft in place within aperture 224 of the insulating sealing member 220 and also secures the current collector 160 to the rivet shaft 245. This keeps the current collector 160 in permanent electrical contact with rivet 240 and prevents the rivet shaft 245 from being removed or dislodged from aperture 224 of the insulating sealing member 220. The rivet head 247 is tightly seated over plastic spacer 250. This forms a subassembly comprising rivet 240, plastic spacer 250, metal cover 230, insulating sealing member 220 and anode current collector 160. The subassembly can be stored until ready for further assembly.

The assembly process is completed by inserting rubber vent plug 260 into cavity 248 within the rivet head 247. Plug 260 is preferably in a truncated conical shape and is designed to fit snugly within cavity 248 of rivet head 247. Plug 260 is preferably of a compressible, resilient material which is resistant to alkaline electrolyte. A preferred material for plug 260 is a rubber such as neoprene or other alkaline resistant compressible rubber. A metal vent pip cap 270 is then inserted over plug 260. The vent pip cap 270 is pressed onto plug 260 with force sufficient to compress the plug by about 0.55 mm. This has been determined to provide a seal which can withstand internal gas pressure buildup of about 200 psig ($13.79 \times 10^5$ pascal). Plug 260 compression can be adjusted so that the seal can withstand internal pressures typically between about 100 and 300 psig ($6.895 \times 10^5$ and $20.69 \times 10^5$ pascal gage), desirably between about 100 and 200 psig ($6.895 \times 10^5$ and $13.79 \times 10^5$ pascal gage). Higher degree of compression of plug 260 is also possible, if desired, to enable the seal to withstand higher pressures, that is, higher than 300 psig ($20.69 \times 10^5$ pascal gage). Conversely reduced compression of plug 260 is possible, if desired, so that the seal is maintained up to a pressure thresholds at any desired value below 100 psig. The base 273 of vent pip cap 270 can have several downwardly extending segments which fit into indentations or crevices 253 within the top surface of plastic spacer 250 as vent cap 270 is pressed onto plug 260. This is shown best in FIG. 5. After vent pip cap 270 is inserted over plug 260, thereby compressing said plug within rivet head cavity 248, vent cap 270 is welded to rivet head 247. Plug 260 is thereby maintained compressed within rivet head cavity 248. The plastic extender member 280 is placed over the vent cap head 271. The vent cap head 271 protrudes through aperture 282 within plastic extender 280. A terminal end plate 290 (negative terminal), is then welded to vent cap head 271. Vent cap 270 is thus welded to both end plate 290 and rivet 240. Terminal end plate 290 is constructed of a conductive metal having good mechanical strength and corrosion resistance such as nickel plated cold rolled steel or stainless steel, preferably, nickel plated low carbon steel. Thus, a completed end cap assembly 12 is formed with terminal end plate 290 in permanent electrical contact with current collector 163.

The completed end cap assembly 12 is then inserted into the open end 102 of casing 100. The current collector shaft 162 penetrates into anode slurry 150. The edge of metal cover 230 is welded, preferably by laser welding, to the top peripheral edge 104 of the casing. This holds the end cap assembly 12 securely in place and seals the open end 102 of the casing as shown in FIGS. 1 and 1A. End terminal plate 290 is in electrical contact with current collector 160 and anode 150, and thus forms the cell's negative terminal for the zinc/MnO2 alkaline cell embodiment described herein. It will be appreciated that the negative terminal plate 290 is electrically insulated from casing 100 by plastic extender 240. Rivet 240 and anode current collector 160 is electrically insulated from casing 100 by plastic spacer 250 and insulating sealing member 220. As shown in FIGS. 1A, 2 and 3, pip 180 at the opposing closed end of casing 100 forms the cell's positive terminal. The pip 180 can be integrally formed from the closed end 104 of the casing or may be a formed of a separate plate 184, which is separately welded to the closed end as shown in FIG. 1A. The completed cell is shown in the perspective views of FIGS. 1 and 1A and in cross sectional views of FIGS. 2 and 3.

In operation during cell discharge or storage, if the gas pressure within the cell builds up to exceed the design threshold level, plug 260 becomes unseated within rivet head cavity 248. This will allow gas to escape from within the cell interior through rivet head cavity 248, then through vent aperture 272 of vent cap 270 and to the external environment. As pressure within the cell is reduced, plug 260 becomes reseated within rivet head cavity 248.

It is not intended to restrict the invention to any particular size rectangular cell. However, by way of particular example, the alkaline cell 100 can be is a small sized rectangular (cuboid), typically having a thickness between about 5 and 10 mm, particularly a thickness between about 5 and 7 mm as measured by the outside surface of the casing in the direction of the cell thickness. The cell width may typically be between about 12 and 30 mm and the cell length may typically be between about 40 and 80 mm. In particular the alkaline cell 10 of the invention can be used as a replacement for same sized rechargeable nickel metal hydride cells, for example, standard 7/5-F6 size rectangular cells. The 7/5-F6 size cell has thickness of 6.1 mm, width of 17.3 mm, and length of about 67.3 mm.

Chemical Composition of a Representative Cell

The following description of cell composition regarding chemical composition of anode 150, cathode 110 and separator 140 is applicable to the flat cell disclosed in the above described embodiment.

In the above described cell 10, the cathode 110 comprises manganese dioxide, and an anode 150 comprises zinc and electrolyte. The aqueous electrolyte comprises a conventional mixture of KOH, zinc oxide, and gelling agent. The anode material 150 can be in the form of a gelled mixture containing mercury free (zero-added mercury) zinc alloy powder. That is, the cell has a total mercury content less than about 100 parts per million parts (ppm) of zinc by weight, preferably less than 50 parts mercury per million parts of zinc by weight. The cell also preferably does not contain any added amounts of lead and thus is essentially lead-free, that is, the total lead content is less than 30 ppm, desirably less than 15 ppm of the total zinc in the anode. Such mixtures can typically contain aqueous KOH electrolyte solution, a gelling agent (e.g., an acrylic acid copolymer available under the tradename CARBOPOL C940 from B.F. Goodrich), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 110 desirably has the following composition: 87–93 wt % of electrolytic manganese dioxide (e.g., Trona D from Kerr-McGee), 2–6 wt % (total) of graphite, 5–7 wt % of a 7–10 Normal aqueous KOH solution having a KOH concentration of about 30–40 wt %; and 0.1 to 0.5 wt % of an optional polyethylene binder. The electrolytic manganese dioxide typically has an average particle size between about 1 and 100 micron, desirably between about 20 and 60 micron. The graphite is typically in the form of natural, or expanded graphite or mixtures thereof. The graphite can also comprise graphitic carbon nanofibers alone or in admixture with natural or expanded graphite. Such cathode mixtures are intended to be illustrative and are not intended to restrict this invention.

The anode material 150 comprises: Zinc alloy powder 62 to 69 wt % (99.9 wt % zinc containing indium containing 200 to 500 ppm indium as alloy and plated material), an aqueous KOH solution comprising 38 wt % KOH and about 2 wt % ZnO; a cross-linked acrylic acid polymer gelling agent available commercially under the tradename "CARBOPOL C940" from B.F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); organic phosphate ester surfactant RA-600 or dionyl phenol phosphate ester surfactant available under the tradename RM-510 from Rhone-Poulenc (between 100 and 1000 ppm). The term zinc as used herein shall be understood to include zinc alloy powder which comprises a very high concentration of zinc, for example, at least 99.9 percent by weight zinc. Such zinc alloy material functions electrochemically essentially as pure zinc.

In respect to anode 150 of the flat alkaline cell 10 of the invention, the zinc powder mean average particle size is desirably between about 1 and 350 micron, desirably between about 1 and 250 micron, preferably between about 20 and 250 micron. Typically, the zinc powder may have a mean average particle size of about 150 micron. The zinc particles in anode 150 can be of acicular or spherical shape. The spherical shaped zinc particles are preferred, since they dispense better from dispensing nozzles used to fill the relatively small anode cavity of the cell with zinc slurry. The bulk density of the zinc in the anode is between about 1.75 and 2.2 grams zinc per cubic centimeter of anode. The percent by volume of the aqueous electrolyte solution in the anode is preferably between about 69.2 and 75.5 percent by volume of the anode.

The cell 10 can be balanced in the conventional manner so that the mAmp-hr capacity of $MnO_2$ (based on 370 mAmp-hr per gram $MnO_2$) divided by the mAmp-hr capacity of zinc (based on 820 mAmp-hr. per gram zinc) is about 1. However, it is preferred to balance the cell so that the cathode is in significant excess. Preferably cell 10 is balanced so that the total theoretical capacity of the $MnO_2$ divided by the total theoretical capacity of the zinc is between about 1.15 and 2.0, desirably between about 1.2 and 2.0, preferably between about 1.4 and 1.8, more preferably between about 1.5 and 1.7. Cell balance with such cathode excess has been determined to reduce the amount of cathode expansion because there is a smaller percentage conversion of $MnO_2$ to $MnOOH$ on discharge based on total cell weight. This in turn reduces the amount of swelling of the cell casing.

It has been determined desirable to have the casing 100 wall thickness between about 0.30 and 0.45 mm, preferably between about 0.30 and 0.40 mm, desirably between about 0.35 and 0.40. Cell 10 is preferably of cuboid shape (FIGS. 1 and 2) having an overall thickness desirably between about 5 and 10 mm. In combination therewith the cell is balanced so that the cathode is in excess. Desirably the cell is balanced so that the ratio of theoretical capacity of the $MnO_2$ (based on 370 mAmp-hr per gram $MnO_2$) divided by the mAmp-hr capacity of zinc (based on 820 mAmp-hr. per gram zinc) is between about 1.15 and 2.0, desirably between about 1.2 and 2.0, preferably between about 1.4 and 1.8. The ratio of anode thickness to the casing outside thickness is desirably between about 0.30 and 0.40. (Such thicknesses are measured along a plane perpendicular to the longitudinal axis 190, across the thickness (small dimension) of the cell.)

The separator 140 can be a conventional ion porous separator consisting of an inner layer of a nonwoven material of cellulosic and polyvinylalcohol fibers and an outer layer of cellophane. Such a material is only illustrative and is not intended to restrict this invention.

Casing 100, is preferably of nickel plated steel. Casing 100 is desirably coated on its inside surface with a carbon coating, preferably a graphitic carbon coating. Such graphitic coatings can, for example, be in the form of aqueous based graphite dispersion, which can be applied to the casing inside surface and subsequently dried under ambient conditions. The graphitic carbon improves conductivity and can indirectly reduce cell gassing by reducing the chance of surface corrosion occurring on the casing inside surface. The metallic cover 230, negative terminal plate 290 and positive terminal plates 180 are also preferably of nickel plated steel. Current collector 160 can be selected from a variety of known electrically conductive metals found to be useful as current collector materials, for example, brass, tin plated brass, bronze, copper or indium plated brass. Insulating sealing member 220 is preferably of nylon 66 or nylon 612.

The following a specific examples showing comparative performance using same size rectangular cell with different cell balance. The fresh cell in each case had a thickness of 5.6 mm, a width of 17 mm, and length of 67 mm. (All dimensions are outside dimensions without a label around the casing, unless otherwise specified.) The casing 100 wall thickness was the same at 0.38 mm for each of the cells tested. The casing 100 for each cell was nickel plated steel coated on its inside surface with graphitic carbon. The cell configuration was the same in each case, as depicted in the drawings (FIGS. 1–5). The edge of the wide portion (flange 161) of the anode current collector 160 was about 0.5 mm from the inside surface of casing 100. Circumventing skirt 226 of insulating sealing member 220 surrounded said wide portion (flange 161) of current collector 160, thereby providing a barrier between it and the inside wall surface of casing 100.

All cell components, were the same as above described and each cell tested had a vent end cap assembly 12 as shown in the figures. The only difference was in cell balance and anode composition. The comparative cell (Comparative Example) was balanced so that the balance ratio, namely, theoretical capacity of the MnO2 (based on 370 mAmp-hr per gram $MnO_2$) divided by the mAmp-hr capacity of zinc (based on 820 mamp-hr per gram zinc) was 1.1. The test cell of Test Example 1 was balanced so that the balance ratio, namely, theoretical capacity of the MnO2 divided by the theoretical capacity of the zinc was 1.25. The test cells of Test Examples 2 and 3 were balanced so that the theoretical capacity of the MnO2 divided by the theoretical capacity of the zinc was 1.6 and 2.0, respectively.

The comparative and test cells in the following examples were discharged intermittently at cycles of 90 milliwatts power on followed by three hours power off, until a cutoff voltage of 0.9 Volts was reached. (Such intermittent discharge simulates typical usage of portable solid state digital audio players, which are typically capable of using the MP3 audio format.) The actual service hours total was then recorded and the amount of swelling of the cell casing was evaluated and recorded.

COMPARATIVE EXAMPLE (COMPARATIVE CELL)

A comparative test cell 10 of rectangular (cuboid) configuration and end cap assembly shown in the drawings was prepared. The cell as defined by the casing 100 outside dimensions had a length of about 67 mm and a width of about 17 and a thickness (before discharge) of about 5.6 mm. The anode 150 and cathode 110 had the following composition.

| Anode Composition: | |
|---|---|
| | Wt. % |
| Zinc[1] | 70.0 |
| Surfactant[2] (RA 600) | 0.088 |
| Electrolyte[3] (9 Normal KOH) | 29.91 |
| | 100.00 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc.
[3]The electrolyte solution contained gelling agents Waterlock A221 and Carbopol C940 comprising in total about 1.5 wt. % of the electrolyte solution.

| Cathode Composition: | |
|---|---|
| | Wt. % |
| $MnO_2$ (EMD) (Trona D from Kerr McGee) | 87.5 |
| Graphite[1] (NdG15 natural graphite) | 7.4 |
| Electrolyte (9 Normal KOH) | 5.1 |
| | 100.0 |

Notes:
[1]Graphite NdG15 is natural graphite from Nacional De Grafite.

The casing 100 wall thickness for the cell was 0.38 mm. The fresh cell 10 had a length of 67 mm, thickness of 5.6 mm and a width of 17 mm. The cell's anode 150 and cathode 110 was balanced so that the theoretical capacity of the $MnO_2$ (based on 370 mAmp-hr per gram $MnO_2$) divided by the mAmp-hr capacity of zinc (based on 820 mamp-hr per gram zinc) was 1.1. The anode had 2.8 grams zinc. (The cathode had 6.89 grams $MnO_2$.) The anode 150, cathode 110 and separator 140 comprised about 66 percent of the external volume of casing 100 of configuration shown in FIGS. 1 and 1A. The ratio of anode thickness to the casing outside thickness was about 0.35. The thicknesses are measured along a plane perpendicular to the longitudinal axis 190, across the outside thickness (small dimension) of the cell.

The cell was discharged intermittently at cycles of 90 milliwatts with "power on" followed by three hours "power off", until a cutoff voltage of 0.9 Volts was reached. The actual service life was 24.5 hours. The casing had swelled from a thickness of 5.6 mm to a thickness of 6.13 mm. (Thickness measured between outside surface of side walls 106a and 106b shown in FIG. 1A.)

Test Cell Example 1

A test cell 10 of rectangular configuration and of same size as in the comparative example was prepared. The anode 150 and cathode 110 had the following composition.

| Anode Composition: | |
|---|---|
| | Wt. % |
| Zinc[1] | 66.0 |
| Surfactant[2] (RA 600) | 0.083 |
| Electrolyte[3] (9 Normal KOH) | 34.0 |
| | 100.08 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc
[3]The electrolyte solution contained gelling agents Waterlock A221 and Carbopol C940 comprising in total about 1.5 wt. % of the electrolyte solution.

| Cathode Composition: | |
|---|---|
| | Wt. % |
| MnO$_2$ (EMD) (Trona D from Kerr McGee) | 87.5 |
| Graphite[1] (NdG15 natural graphite) | 7.4 |
| Electrolyte (9 Normal KOH) | 5.1 |
| | 100.0 |

Notes:
[1]Graphite NdG15 is natural graphite from Nacional De Grafite.

The casing 100 wall thickness for the test cell was 0.38 mm. The fresh cell 10 had a length of 67 mm, thickness of 5.6 mm and a width of 17 mm. The cell's anode 150 and cathode 110 was balanced so that the theoretical capacity of the MnO$_2$ (based on 370 mAmp-hr per gram MnO$_2$) divided by the mAmp-hr capacity of zinc (based on 820 mAmp-hr per gram zinc) was 1.25. The anode had 2.56 grams of zinc. (The cathode had 7.11 grams MnO$_2$.) The anode, cathode, electrolyte and separator comprised about 66 percent of the external volume of casing 100, that is, as measured between its closed end 104 and open end 102. The ratio of anode thickness to the casing outside thickness was about 0.35. The thicknesses are measured along a plane perpendicular to the longitudinal axis 190, across the outside thickness (small dimension) of the cell.

The cell was discharged intermittently at cycles of 90 milliwatts with "power on" followed by three hours "power off", until a cutoff voltage of 0.9 Volts was reached. The actual service life was 24.3 hours. The casing had swelled from a thickness of 5.6 mm to a thickness of 6.03 mm. (Thickness measured between outside surface of side walls 106a and 106b shown in FIG. 1A.) The service hours were about the same as in the comparative example, however, the casing swelling was less.

Test Cell Example 2

A test cell 10 of rectangular configuration and of same size as in the comparative example was prepared. The anode 150 and cathode 110 had the following composition.

| Anode Composition: | |
|---|---|
| | Wt. % |
| Zinc[1] | 60.0 |
| Surfactant[2] (RA 600) | 0.083 |
| Electrolyte[3] (9 Normal KOH) | 39.92 |
| | 100.00 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc

| Cathode Composition: | |
|---|---|
| | Wt. % |
| MnO$_2$ (EMD) (Trona D from Kerr McGee) | 87.5 |
| Graphite[1] (NdG15 natural graphite) | 7.4 |
| Electrolyte (9 Normal KOH) | 5.1 |
| | 100.0 |

Notes:
[1]Graphite NdG15 is natural graphite from Nacional De Grafite.

The casing 100 wall thickness for the test cell was 0.38 mm. The fresh cell 10 had a length of 67 mm, thickness of 5.6 mm and a width of 17 mm. The cell's anode 150 and cathode 110 was balanced so that the theoretical capacity of the MnO$_2$ (based on 370 mAmp-hr per gram MnO$_2$) divided by the mAmp-hr capacity of zinc (based on 820 mAmp-hr per gram zinc) was 1.6. The anode had 2.01 grams of zinc. (The cathode had 7.13 grams MnO$_2$.) The anode, cathode and separator comprised about 66 percent of the external volume of casing 100. The ratio of anode thickness to the casing outside thickness was about 0.35.

The thicknesses are measured along a plane perpendicular to the longitudinal axis 190, across the outside thickness (small dimension) of the cell.

The cell was discharged intermittently at cycles of 90 milliwatts with "power on" followed by three hours "power off", until a cutoff voltage of 0.9 Volts was reached. The actual service life was 20.9 hours. The casing had swelled from a thickness of 5.6 mm to a thickness of 5.95 mm. (Thickness measured between outside surface of side walls 106a and 106b shown in FIG. 1A).

Test Cell Example 3

A test cell 10 of rectangular configuration and of same size as in the comparative example was prepared. The anode 150 and cathode 110 had the following composition.

| Anode Composition: | |
|---|---|
| | Wt. % |
| Zinc[1] | 52.0 |
| Surfactant[2] (RA 600) | 0.083 |
| Electrolyte[3] (9 Normal KOH) | 47.92 |
| | 100.00 |

Notes:
[1]The zinc particles had a mean average particle size of about 150 micron and were alloyed and plated with indium to yield a total indium content of about 200 ppm.
[2]Organic phosphate ester-based surfactant solution RA600 from Rhône Poulenc
[3]The electrolyte solution contained gelling agents Waterlock A221 and Carbopol C940 comprising in total about 1.5 wt. % of the electrolyte solution.

| Cathode Composition: | |
| --- | --- |
| | Wt. % |
| MnO$_2$ (EMD) (Trona D from Kerr McGee) | 87.5 |
| Graphite[1] (NdG15 natural graphite) | 7.4 |
| Electrolyte (9 Normal KOH) | 5.1 |
| | 100.0 |

Notes:
[1]Graphite NdGl5 is natural graphite from Nacional De Grafite.

The casing 100 wall thickness for the test cell was 0.38 mm. The fresh cell 10 had a length of 68 mm, thickness of 5.6 mm and a width of 17 mm. The cell's anode 150 and cathode 110 was balanced so that the theoretical capacity of the MnO$_2$ (based on 370 mAmp-hr per gram MnO$_2$) divided by the mAmp-hr capacity of zinc (based on 820 mAmp-hr per gram zinc) was 2.0. The anode had 1.61 grams of zinc. (The cathode had 7.13 grams MnO$_2$.) The anode, cathode and separator comprised about 66 percent of the external volume of casing 100. The ratio of anode thickness to the casing outside thickness was about 0.35.

The thicknesses are measured along a plane perpendicular to the longitudinal axis 190, across the outside thickness (small dimension) of the cell.

The cell was discharged intermittently at cycles of 90 milliwatt with "power on" followed by three hours "power off", until a cutoff voltage of 0.9 Volts was reached. The actual service life was 18.5 hours. The casing had swelled from a thickness of 5.6 mm to a thickness of 5.87 mm. (Thickness measured between outside surface of side walls 106a and 106b shown in FIG. 1A).

Discussion of the Test Results

In the above tests, the same size flat cell has been balanced at progressively higher balance ratios. The cell configuration was the same in each case, as depicted in the drawings (FIGS. 1–5). The edge of the wide portion (flange 161) of the anode current collector 160 was about 0.5 mm from the inside surface of casing 100 and was surrounded by insulating barrier 226. The balance ratios have been defined as the theoretical capacity of the MnO$_2$ (based on 370 mAmp-hr per gram MnO$_2$) divided by the mAmp-hr capacity of zinc (based on 820 mAmp-hr per gram zinc). In the above Comparative Test swelling of the flat test cell increases significantly from an overall thickness of 5.6 mm to 6.13 mm when the cell's balance ratio (theoretical capacity of MnO$_2$ to theoretical capacity of zinc) is about 1.1. In test Example 1 (balance ratio of 1.25) the cell swells less, namely from 5.6 mm to 6.03 mm. In test Example 2 (balance ratio of 1.6) the cell swells from 5.6 mm to 5.95 mm. In test Example 3 (balance ratio of 2.0) the cell swells even less from 5.6 mm to 5.87 mm. The cell service life becomes moderately less (from 24.5 hours to 20.9 hours) as balance ratios increase between 1.1 and 1.6 and more significantly less (18.5 hours) at the highest balance ratio of 2.0.

Although the preferred embodiments of the invention have been described with respect to a flat alkaline battery having the overall shape of a cuboid (rectangular parallelepiped), it will be appreciated that variations of such overall shape are possible and are intended to fall within the concept of the invention. In the case of a flat battery, for example, in the shape of a cuboid (rectangular parallelepiped), the terminal ends of the housing could be slightly outwardly or inwardly tapered, yet maintaining their rectangular configuration. The overall appearance of such varied shape is still essentially that of a cuboid and is intended to fall within the meaning of cuboid or legal equivalent thereof. Other variation to the overall shape such as altering slightly the angle that the ends of the battery make with any one of the sides of housing, so that the parallelepiped deviates slightly from strict rectangular, is also intended to fall within the meaning of cuboid (rectangular parallelepiped) as used herein and in the claims.

The present invention is intended to extend desirably to an overall battery shape that is flat in that a side of the outer casing along the length of the casing is substantially flat. Thus, it shall be understood also that the term "flat" is intended to extend to and include surfaces that are substantially flat in that the degree of curvature of such surface may be slight. In particular the concept of the present invention is intended to extend to flat batteries wherein a side of the battery casing surface along the length of the casing has a flat polygonal surface. The battery may thus have the overall shape of a polyhedron with all sides of the outer casing being polygonal. The invention is also intended to extend to batteries wherein a side of the battery casing along its length has a flat surface, which is a parallelogram and wherein the overall shape of the battery is prismatic.

What is claimed is:

1. A primary alkaline cell comprising a negative and a positive terminal, and an outer housing having a closed end and opposing open end, an anode comprising zinc and a cathode comprising MnO$_2$ within said housing, a separator between said anode and cathode, and an end cap assembly sealing the open end of said housing; said end cap assembly comprising an insulating sealing member and an anode current collector in communication therewith, with at least a portion of said current collector penetrating into said anode;

wherein at least a portion of said current collector extends outwardly to within at most 2 mm of said housing inside surface, wherein said outer housing has a pair of opposing flat sides running along a portion of the length of said housing; said housing having a closed end and opposing open end and said housing not having any integral cylindrical sections;

wherein the cathode comprises at least one cathode slab having an opening defined therethrough devoid of cathode material, wherein anode material is inserted into said opening in said cathode slab and a portion of said anode current collector penetrates into said anode, wherein said housing is of cuboid shape; wherein said cathode comprises a plurality of cathode slabs of rectangular shape, each slab having an opening defined therethrough devoid of cathode material; wherein said slabs are aligned so that said openings are in alignment forming a core devoid of cathode material, with the outer surface of said cathode contacting the inside surface of said housing.

2. A primary alkaline cell comprising a negative and a positive terminal, and an outer housing having a closed end and opposing open end, an anode comprising zinc and a cathode comprising MnO$_2$ within said housing, a separator between said anode and cathode, and an end cap assembly sealing the open end of said housing; said end cap assembly comprising an insulating sealing member and an anode current collector in communication therewith, with at least a portion of said current collector penetrating into said anode;

wherein at least a portion of said current collector extends outwardly to within at most 2 mm of said housing inside surface;

wherein said insulating sealing member has a surface extending into the space between said housing inside surface and said outwardly extending portion of said current collector, thereby providing a barrier between said outwardly extending portion of the current collector and said housing inside surface, wherein said insulating sealing member is in the shape of a slab having a downwardly extending circumferential skirt when the cell is viewed in vertical position with the end cap assembly on top, said skirt surrounding said outwardly extending portion of said current collector, thereby providing a barrier between said outwardly extending portion of the current collector and said housing inside surface, wherein said anode current collector comprises an elongated shaft portion and integral portion extending outwardly therefrom; wherein said outwardly extending portion of said current collector is fastened to said insulating sealing member and said outwardly extending portion of said current collector is surrounded by said downwardly extending skirt of said insulating sealing member, thereby providing a barrier between said outwardly extending portion of the current collector and the inside surface of said housing, wherein said insulating sealing member is of cuboid shape having a closed end and an opposing open end with side walls therebetween surrounding a hollow interior within said insulating sealing member, said side walls forming said circumferential skirt; wherein said outwardly extending portion of the anode current collector is inserted within said hollow interior and is protected by said circumferential skirt.

3. A primary alkaline cell comprising a negative and a positive terminal, and an outer housing having a closed end and opposing open end, an anode comprising zinc and a cathode comprising $MnO_2$ within said housing, a separator between said anode and cathode, and an end cap assembly sealing the open end of said housing; said end cap assembly comprising an insulating sealing member and an anode current collector in communication therewith, with at least a portion of said current collector penetrating into said anode;

wherein at least a portion of said current collector extends outwardly to within at most 2 mm of said housing inside surface;

wherein said insulating sealing member has a surface extending into the space between said housing inside surface and said outwardly extending portion of said current collector, thereby providing a barrier between said outwardly extending portion of the current collector and said housing inside surface, wherein said insulating sealing member is in the shape of a slab having a downwardly extending circumferential skirt when the cell is viewed in vertical position with the end cap assembly on top, said skirt surrounding said outwardly extending portion of said current collector, thereby providing a barrier between said outwardly extending portion of the current collector and said housing inside surface, wherein said anode current collector comprises an elongated shaft portion and integral portion extending outwardly therefrom; wherein said outwardly extending portion of said current collector is fastened to said insulating sealing member and said outwardly extending portion of said current collector is surrounded by said downwardly extending skirt of said insulating sealing member, thereby providing a barrier between said outwardly extending portion of the current collector and the inside surface of said housing, wherein said insulating sealing member is of cuboid shape having a closed end and an opposing open end with side walls therebetween surrounding a hollow interior within said insulating sealing member, said side walls forming said circumferential skirt; wherein said outwardly extending portion of the anode current collector is inserted within said hollow interior and is protected by said circumferential skirt, wherein said insulating sealing member has an aperture through said closed end of said insulating sealing member, and the end cap assembly further comprises a metal rivet inserted through said aperture, wherein said rivet fastens said outwardly extending portion of said current collector to said closed end of the insulating sealing member, said rivet being in electrical communication with said negative terminal.

4. A primary alkaline cell comprising a negative and a positive terminal, and an outer housing having a closed end and opposing open end, an anode comprising zinc and a cathode comprising $MnO_2$ within said housing, a separator between said anode and cathode, and an end cap assembly sealing the open end of said housing; said end cap assembly comprising an insulating sealing member and an anode current collector in communication therewith, with at least a portion of said current collector penetrating into said anode;

wherein at least a portion of said current collector extends outwardly to within at most 2 mm of said housing inside surface;

wherein said insulating sealing member has a surface extending into the space between said housing inside surface and said outwardly extending portion of said current collector, thereby providing a barrier between said outwardly extending portion of the current collector and said housing inside surface, wherein said outer housing has a pair of opposing flat sides running along a portion of the length of said housing, and said housing not having any integral cylindrical sections;

wherein the cathode comprises at least one cathode slab having an opening defined therethrough devoid of cathode material, wherein anode material is inserted into said opening in said cathode slab and a portion of said anode current collector penetrates into said anode, wherein said housing is of cuboid shape and the overall thickness of said cell is between about 5 and 10 mm; wherein said cathode comprises a plurality of cathode slabs of rectangular shape, each slab having an opening defined therethrough devoid of cathode material; wherein said slabs are aligned so that said openings are in alignment forming a core devoid of cathode material, with the outer surface of said cathode contacting the inside surface of said housing.

* * * * *